Patented June 24, 1941

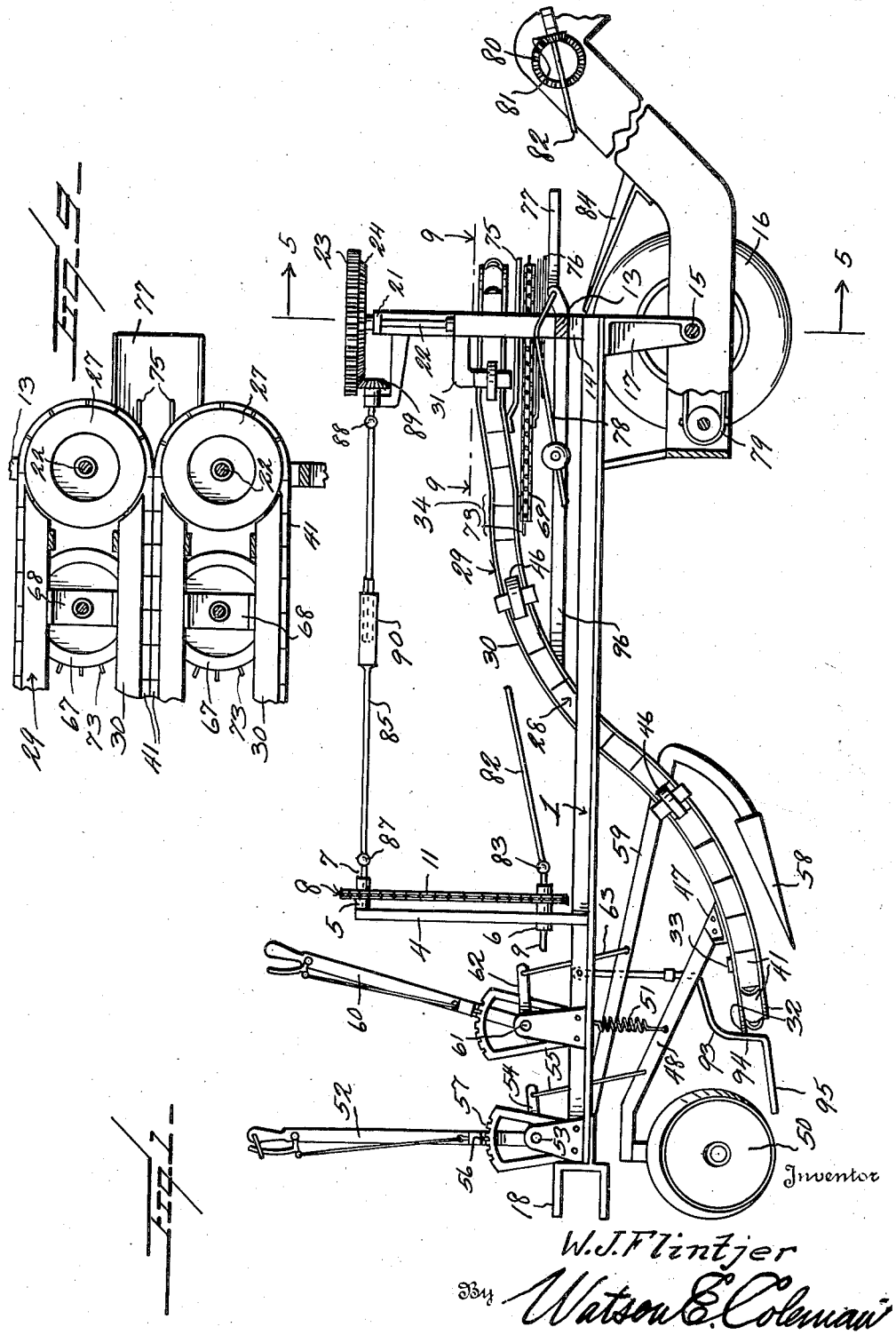

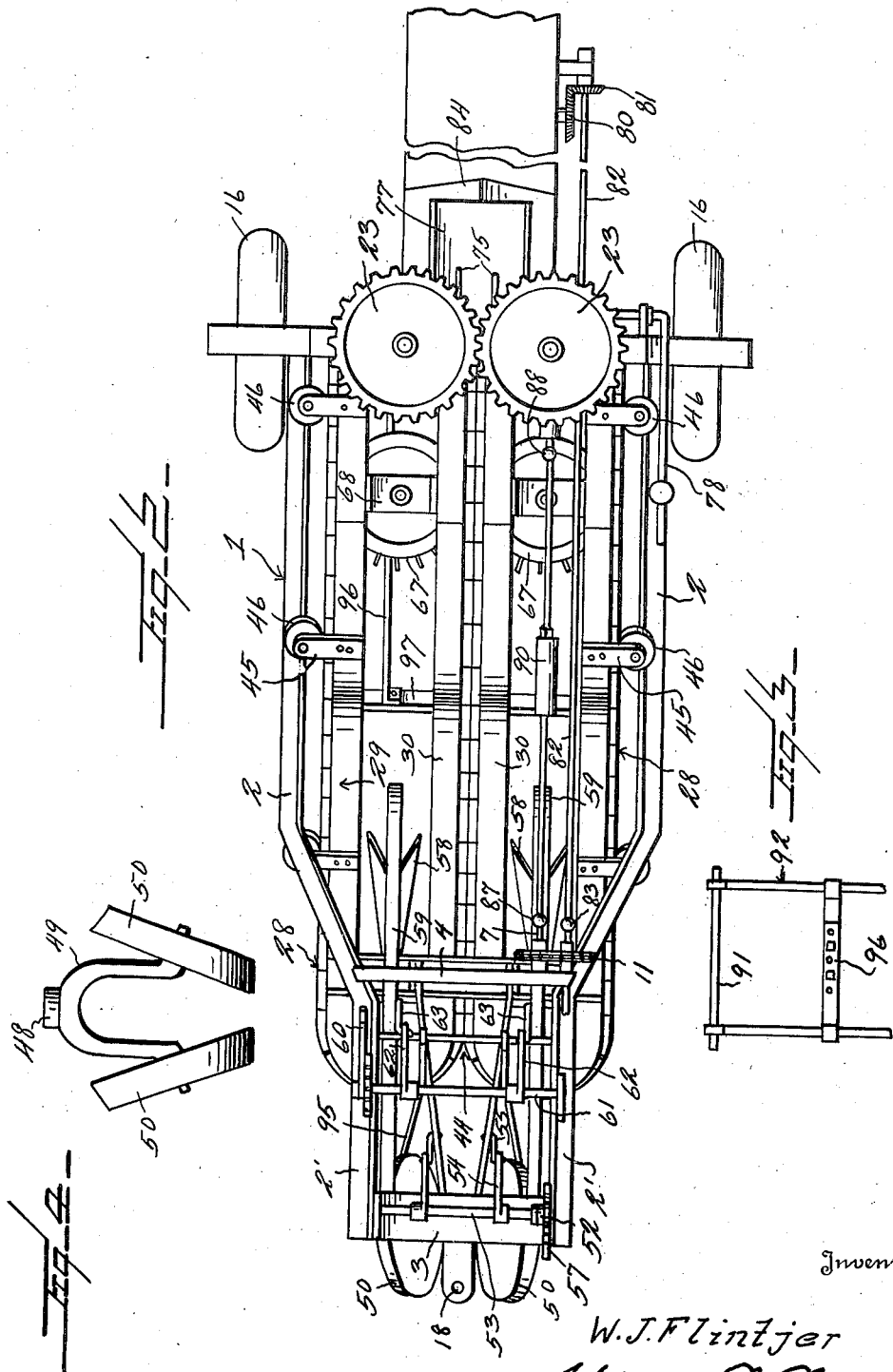

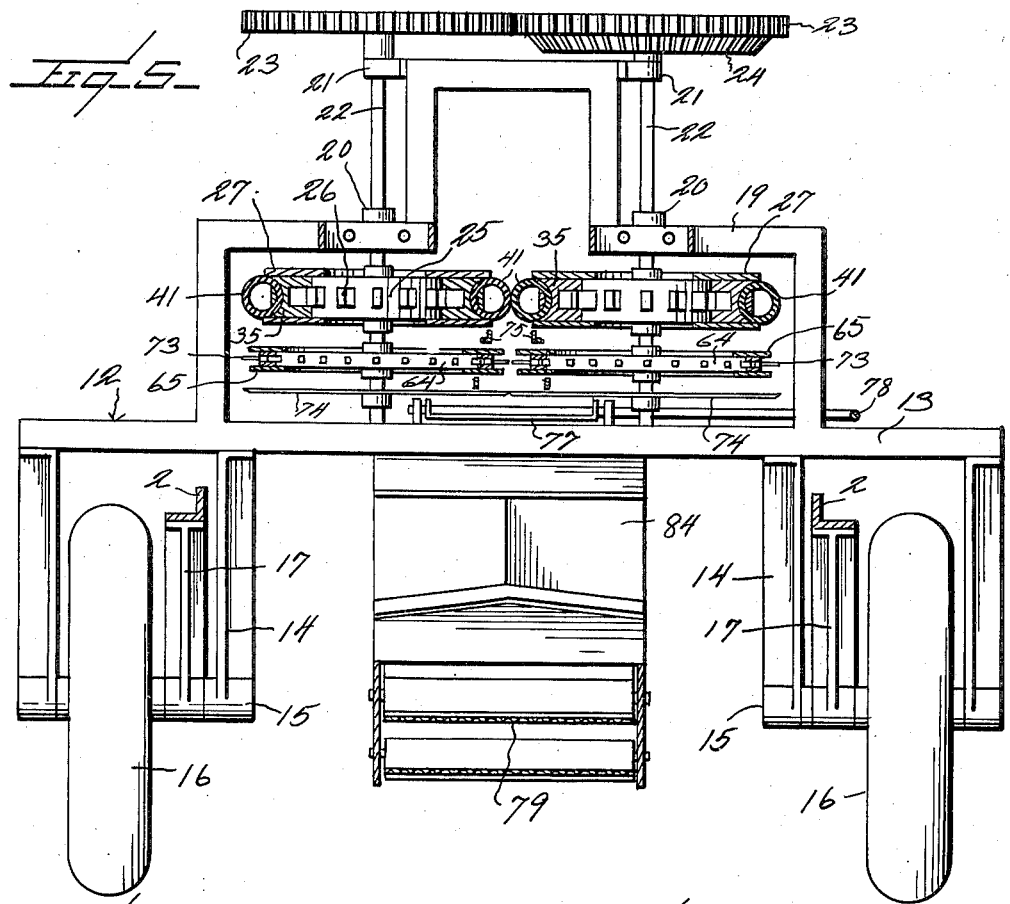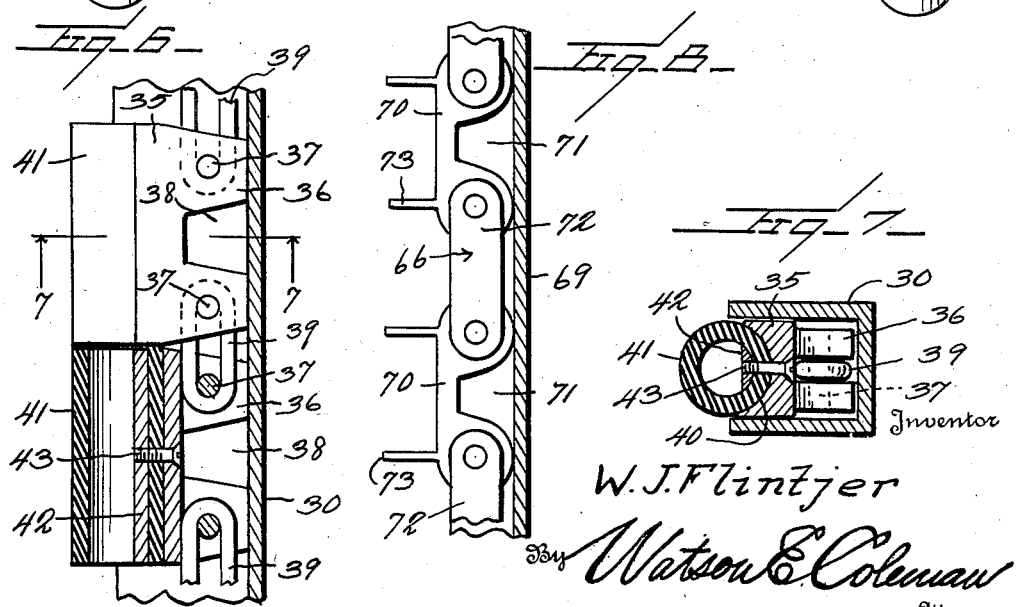

2,247,293

UNITED STATES PATENT OFFICE 2,247,293

BEET HARVESTER

Walter J. Flintjer, Cheyenne, Wyo.

Application July 29, 1939, Serial No. 287,420

16 Claims. (Cl. 55—108)

This invention relates generally to harvesters and pertains particularly to improvements in machines for harvesting beets.

The primary object of the present invention is to provide a novel and improved beet harvesting machine wherein there is provided a novel mounting for an elevating mechanism by means of which the beets are lifted from the ground after being loosened by suitable plow members, by which said elevating mechanism may be readily raised and lowered with respect to the ground.

Another object of the invention is to provide in a beet harvesting mechanism having a top gripping elevator structure, a novel leaf lifter by means of which the tops of the beets may be raised from the ground so that they may be readily gripped by the elevator, whereby the subsequent raising of the beet from the ground is facilitated.

A further object of the invention is to provide a beet harvesting machine employing a pair of endless elements operating together to form an elevator, wherein such endless elements are of a novel form whereby a resilient gripping of the top of the beet without mashing or cutting through the same is obtained.

A still further object of the present invention is to provide a novel beet harvesting machine employing an elevator structure for the beets by which the latter are carried to the topping knives, in which such structure is rockably supported at the rear end of the machine for vertical oscillation coaxially with the machine supporting wheels whereby the front end of the elevator structure may be raised and lowered as desired.

Still another object of the invention is to provide in a beet harvesting machine of the herein described character, a novel plow control mechanism whereby the plows may be regulated for depth of penetration into the earth independently of the beet lifting conveyor mechanism.

Other objects and advantages of the invention will become apparent as the description of the same proceeds and the invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 is a view in side elevation of a machine constructed in accordance with the present invention.

Fig. 2 is a view in top plan of the machine.

Fig. 3 is a view illustrating the mounting for the leaf or top lifters.

Fig. 4 is a view in front elevation of the ground engaging gauge wheels which move in advance of the top lifter.

Fig. 5 is a sectional view taken substantially on the line 5—5 of Fig. 1.

Fig. 6 is a view in longitudinal section of a portion of one endless element of the elevator.

Fig. 7 is a transverse section taken on the line 7—7 of Fig. 6.

Fig. 8 is a sectional view taken through a portion of one of the pair of beet gripping chains.

Fig. 9 is a fragmentary section taken substantially on the line 9—9 of Fig. 1.

Referring now more particularly to the drawings, the numeral 1 generally designates the main body frame for the present machine, which frame is made up of the longitudinally extending spaced side beams 2 which at their forward ends are connected by the cross connecting plate 3. These side beams 2 converge slightly at their forward ends as shown in Fig. 2, so that the front end of the machine has a portion of reduced width which is made up of the spaced parallel inset front end sections 2' of the beams 2. At the inner or rear ends of these inset sections of the frame side beams, there is an upright transverse frame 4 which supports upper and lower bearings 5 and 6, respectively, the upper bearing carrying a short shaft 7 which supports a sprocket wheel 8 while the lower bearing 6 supports a power take-off shaft 9 and a sprocket wheel 10, the sprocket wheels being connected for simultaneous rotation by a chain 11. From these shafts 7 and 9 power connections are made with driven mechanism hereinafter described.

At the rear end of the frame 1 a wheel supported frame is disposed which is shown particularly in Fig. 5 and generally indicated by the numeral 12. This frame comprises a cross beam 13 from which extend downwardly, at each end, a pair of hanger bearings, each of which is indicated by the numeral 14, and between which are supported axles 15, each of which carries the ground wheel 16. Also supported upon each of the axles 15 is an upright bearing 17 which supports the rear end of a frame beam 2. It will thus be seen that the frame 1 is rockably supported on the machine axles 15 concentrically with the wheels 16 which support the rear end of the machine.

The front end of the machine frame is provided with a hitch 18 which may be connected with the cross connecting plate 3, as shown in Fig. 2, for attachment to a draft machine. The draft machine supports the forward end of the frame 1 through the medium of this hitch.

The upright frame 12 also includes an upwardly extending yoke 19 which supports through suitable bearings 20 and 21, a pair of vertically disposed rotatable shafts 22 which are arranged in spaced relation at opposite sides of the longitudinal center of the machine. Each of these shafts at its upper end carries a gear wheel 23, which gear wheels are in mesh or in toothed connection for unitary rotation, as shown in Fig. 5, and formed integral with one of these gear wheels upon the underside of the same is a beveled gear 24.

Supported upon each of the shafts 22 in a plane below the lower bearings 20 is a toothed endless conveyor wheel 25, each wheel including the teeth units 26 and upper and lower annular guide plates 27 which project a substantial distance beyond the periphery of the wheel on which they are mounted as shown in Fig. 5, for the purpose of maintaining in position about the wheel an endless carrier forming one run of the conveyor structure as hereinafter more particularly described.

The said endless conveyor structure is made up of a pair of endless carriers, each of which is indicated generally by the numeral 28 and a pair of guides for each endless carrier, each of which guides is generally designated by the numeral 29. Each of these guides 29 for an endless carrier cooperates with the flanges of a toothed wheel 25 to form an endless track or guide for a carrier and the guides extend longitudinally of the machine in side by side relation, as shown in Fig. 2, and each one consists of a pair of spaced parallel oppositely opening channel members 30 which at their rear ends terminate adjacent a toothed endless carrier wheel 25 and are supported by suitable brackets 31 carried by the yoke portion 19 of the upright rear frame, as is shown in Fig. 1. The top and bottom flanges of each guide member are in the planes of the top and bottom flanges 27 of the adjacent toothed wheel 25 so that the endless carrier which is supported by the guides or tracks may pass smoothly from the channels of the tracks in between the flanges of the toothed wheels at the rear of the machine.

At the forward end of the endless conveyor structure each pair of channel members 30 merges with a pair of vertically spaced plates 32 between which is supported on the pivot 33, a suitable toothed wheel (not shown) which is similar to the wheel 25. The plates 32 carry the endless carriers around the forward sprocket wheels and are formed integral with the channel members 30 and do not turn with the forward sprocket wheels. While the tracks or guides extend longitudinally of the machine, as shown in Fig. 2, and through substantially the entire length of the machine, it will be seen upon reference to Fig. 1, that they are formed with a series of curves whereby the forward ends of the guides will be disposed in relatively close proximity to the ground while the rear ends are maintained at an elevation above the frame 1. Thus the guides, starting at the forward low ends thereof, define a downwardly bowed curved portion merging with an upwardly bowed curved portion whereby a substantially ogee curvature is obtained when viewing the structure in side elevation. At the upper end of the portion of ogee curvature, the guides extend substantially horizontally for a very short distance through the distance indicated at 34, and then the guides incline upwardly slightly, terminating adjacent the flanges 27 of the rear sprocket wheels 25.

The portion 34 of the guides and the other parts associated therewith are hereinafter more fully described and this particular portion of the machine is of special importance as will be hereinafter pointed out.

As will be readily seen upon reference to Fig. 2, the inner ones of the channel members 30 are in relatively closely spaced relation and have their open sides opposed.

Each of the guide units 29 associated with the flanges of the wheels 25 and the integral plates 32 forms an endless guide means for an endless carrier 28. Each of these endless carriers is in the form of an endless chain of novel construction. This chain comprises a series of elongated bodies 35, each of which is cast or otherwise formed to have at each end and upon one side thereof a pair of spaced ears 36, the ears being connected by a pin 37. The spaces 38 between the two pairs of ears 37 of each body receive the teeth of the sprocket wheels 25 and of the corresponding wheels at the front end of the conveyor structure. The bodies 35 are connected together by coupling links 39 which have their ends disposed between the pairs of ears 36 and have the pins 37 passed therethrough, as shown in Fig. 6, so as to form the endless carrier structure.

The bodies 35 move or slide in the channel members 30, the ends of the ears 36 bearing against the inner or back wall of the channel, as shown in Figs. 6 and 7, and the outer sides of the bodies 35 are longitudinally channeled or recessed, as indicated at 40 in Fig. 7, to receive the short tubular bodies 41 which are formed of rubber or other suitable resilient material. These bodies 41 are held in place by inserted clamp bars 42 which extend longitudinally therethrough, as shown in Fig. 7, and are joined to the adjacent body 35 by a pin or screw 43. The tubular bodies 41 are of sufficient length so that they will come into close end to end relation, as shown in Fig. 6, and thus form a substantially continuous tubular strand as a part of the endless carrier. As shown in Figs. 6 and 7, the depth of the channel members 30 is such that the major portion of the tubular bodies 41 will project from the channel and thus when these tubular bodies travel along the inner channels members 30, as shown in Fig. 2, those tubular bodies of one endless carrier will come into parallel abutting relation with the tubular bodies of the adjacent or opposing endless carrier. The joining together of these tubular bodies in the endless carrier to form the conveyor structure for the beets, takes place at the front end of the machine adjacent the plates 32, the tops of the beets entering into the bight at the point 44, Fig. 2. Thus there is provided a central carrier and elevator for the beets which moves from the lower part of the front of the machine to the upper part of the machine at the rear thereof, terminating substantially at the transverse center of the yoke 19.

The outer ones of the channel members 30 along which the outer runs of the endless carriers 28 travel, have secured thereto at spaced intervals outwardly extending pairs of arms 45 between which are guide rollers 46 which bear against the outer runs of the tubular members of the endless carriers. These rollers 46 serve to maintain the outer runs of the carriers in position in the guide channels.

The forward ends of the guides for the endless carriers may be joined together by a cross beam 47 and extending forwardly from such beam is a pair of arms 48 which converge their forward ends and are connected with an axle yoke 49 which carries a pair of guide wheels 50. These wheels, as shown in Fig. 4, are arranged in downwardly convergent relation and are designed to pass along a row of beets, straddling the row, and engaging the ground at the side of the beet. By converging these guide wheels in the manner shown so that they will run close to the beets, they will maintain the attached mechanism at the proper elevation even though the sides of the hill in which the beets grow may be washed away. If the wheels were vertically arranged so as to be far apart where they engage the ground, they would drop into the irrigation channels at the sides of the row of beets and would let the following mechanism drop too low to properly grip the tops of the beets but by converging the wheels so that they will engage the ground close to the sides of the beets, the wheels will always maintain substantially the same elevation and since the sole support for the forward end of the beet conveyor structure consists of this pair of gauge wheels, it will be obvious that the conveyor structure will be maintained at the proper elevation so that the tops of the beets will be properly caught between the endless carriers at the point 44 indicated in Fig. 2.

As previously stated, the front end of the elevator structure is supported entirely by the gauge wheels 50. In order that the strain of supporting the conveyor may be relieved to some extent for the gauge wheels, the arms 48 are joined with the overlying frame beams 2' by contractile springs 51.

The raising and lowering of the elevator structure is accomplished through the medium of a lever 52 which is carried upon a shaft 53 disposed transversely of the machine for oscillation and which carries a pair of cranks 54, each of which is connected by a link 55 with an arm 48. This lever 52 carries the usual spring pressed pawl 56 for connection with the toothed segment 57 whereby the elevator structure may be held raised. During working operations of the machine, the pawl 56 is held in retracted position so that the elevator and the gauge wheels may have free up-and-down movement.

Immediately behind the lower forward ends of the elevator, there are disposed plows 58, each of which is supported upon the rearwardly extending beam 59, the forward ends of these beams being pivotally secured to the underside of the plate 3, the specific pivotal suspension for the beams not being illustrated. This permits the plows 58 to be raised and lowered and such raising and lowering is effected through the medium of a lever 60 supported for oscillation on a shaft 61 which extends transversely of the frame and carries a pair of arms 62, each of which is connected by the link 63 with a plow beam. The points of the plows 50 are arranged in sufficiently close proximity to the underside of the elevator so that the plows will lift each beet from the ground just as the top of the beet is being gripped between the inner runs of the carriers which make up the elevator.

Supported upon each shaft 22 in relatively close proximity to the underside of a sprocket wheel 25 is a second sprocket wheel 64 which is of similar construction to the sprocket wheels 25 in that each of the second wheels carries upper and lower annular plates 65 which project beyond its periphery and which act as guides for the sprocket chains 66 which pass around the wheels 64. These chains also pass around forward sprocket wheels 67 which are in the same horizontal plane as the wheels 64 and which are pivotally supported on suitable supporting brackets 68, beneath the horizontal part of area 34 of the endless conveyor. The endless chains 66 which connect the longitudinally spaced sprocket wheels 64 and 67 are gripper chains for the beets where the tops connect with the bodies of the beets. These gripper chains are carried in guides 69 which correspond with the guides 30 for the endless carriers and the inner runs of these guides are beneath and parallel with the inner runs of the guides 30 so that the gripper chains will have inner runs which come into parallel relation at the longitudinal center of the machine as illustrated in Fig. 5. The forward ends of the parallel portions of the gripper chains are disposed immediately beneath the straight or horizontal portion 34 of the elevator so that as the beets are raised by the elevator, they will be carried for a short distance along a horizontal path at which time they will be gripped at the base of the top between the inner runs of the gripper chain. A portion of this gripper chain 66 is shown in Fig. 8 where it will be seen that the chain is made up of a series of elongated bodies 70, each having a central recess 71 at one side for engagement by the teeth of the sprocket wheels about which the chain passes, and intermediate flat link members 72 which connect the bodies 70 for articulated movement. The bodies 70 are here shown as having prongs or teeth 73 which extend away from the guide 69 so that when the bodies of the two endless chains come into opposed relation to form the central or inner runs of the gripper structure, these teeth will be in opposed relation, as shown in Fig. 5, to hold the tops of the beets. If preferred, the number of teeth on the gripper chains may be increased or they may be eliminated entirely, as may be found best suited for the operating conditions under which the machine is worked.

Supported upon each of the vertical shafts 22 beneath a sprocket wheel 64 is a disk knife 74. The peripheries of these knives come into close relation at the longitudinal center of the machine beneath the gripper chains and the conveyor as shown in Fig. 5. The edges of these disk knives may be smooth or toothed as found desirable.

Upon the inner side of each of the guides for the endless carriers, adjacent the sprocket wheels 25 there are supported rearwardly extending guide fingers 75 which lie between the guides for the endless carriers and the guides for the gripper chains, as shown in Fig. 5. Directly beneath these guide fingers 75 are other guide fingers 76 which are secured at their inner ends to the guides for the gripper chains. These guide fingers above and below the gripper chains, extend rearwardly a substantial distance as shown in Fig. 1, and maintain their spaced parallel relation throughout so that as the beet tops are freed by the conveyor and the gripper chains, they will be pulled away from the conveyor and chains by the fingers and permitted to drop down onto a pivoted platform 77 which is mounted at the rear of the vertical frame 12. This platform carries a weighted counterbalance arm 78 by which it is normally maintained in horizontal position but which yields to dump the beet tops carried thereon when the number of tops accumulate to the extent that their weight overcomes the weight on the arm 78.

Suspended in a suitable manner between the wheels 16 and below the beam 13 of the vertical frame 12 is a flat endless conveyor 79. This conveyor extends rearwardly and upwardly as shown in Fig. 1, and at its upper rear end it has connected therewith a driven gear 80 with which is coupled a gear pinion 81 carried by a shaft 82 which extends forwardly for connection through the medium of a universal joint 83, with the power take-off shaft 9. The housing or frame for the endless conveyor 79 supports a chute 84 beneath the beet top receiving platform 77. Onto this chute the beet tops are dumped and the chute inclines toward the side of the machine so that the tops will slide off to be deposited on the ground at one side of the machine as the same passes through the field. The conveyor 79 is of suitable construction so that the beets which fall thereon after being severed from their tops by the knives 74, will be carried rearwardly and upwardly to be discharged from the rear end of the conveyor 79 into a suitable vehicle which may be connected with the harvester so as to trail it.

The desired rotary motion for the shafts 22 is transmitted thereto by means of the longitudinally adjustable shaft 85 which at one end is connected by a universal joint 87 with the shaft 7 while at its other end it is connected through the medium of a universal joint 88, with a gear pinion 89 which is in toothed connection with the gear 24. As stated, the shaft 85 is longitudinally adjustable, this being effected by making the shaft in two parts and joining them by the sliding joint 90.

At the forward end of the machine just above the beet elevator there are supported upon a cross bar 91, two depending arms each of which is generally indicated by the numeral 92. Each of these arms adjacent its lower end has a forwardly and downwardly inclined portion 93 which merges with a vertical downwardly extending part 94 and this latter part terminates in the tips 95 which are in close proximity to the ground. The vertical part 94 of each arm 92 extends across the edge of the top one of a pair of plates 32. These arms 92 are connected by the adjustable link 96 so that they may be shifted relative to one another to move them together or apart as may be found desirable. These arms function as beet top raising devices by which the tops may be picked up from the ground and held in such position that they may be conveniently gripped by the endless carriers as they enter the bight portion of the conveyor at the point 44. By disposing the arms in close proximity to the front ends of the two portions of the conveyor, it will be apparent that when these portions are raised by means of the lever 52, the ends of the conveyor portions will ride up under the forward ends of the parts 93 of the arms and oscillate them upwardly and away from the ground. Normal up-and-down movement of the elevator during the use of the machine will not cause any vertical shifting of the leaf lifting arms as the elevator will not contact the arms to shift them until it has been raised a substantial distance by the actuation of the lever 52. Where small beets with small tops are being dug, the arms may be adjusted so as to bring them closer together and obviously when larger beets are being dug, the arms will be shifted outwardly so that they may function properly to lift the tops of such larger beets.

In order that the central part of the elevator structure may be suitably embraced, there are provided longitudinally extending bracing arms 96 which are joined at their rear ends to the vertical frame 12 and extend forwardly for connection with suitable transverse plates 97 which are secured to the undersides of the endless carrier guides.

In the operation of the present machine, the gauge wheels 50 pass along the row of beets on opposite sides of the beets and in close proximity thereto as previously stated and the forwardly extending terminal portions 95 of the leaf lifters pass under the leaves and raise them from the ground elevating the leaves in such a manner as to permit the forward part of the elevator structure to pass on opposite sides of the beet top thus enabling the endless carriers to grip the top between them. Simultaneously with the gripping of the tops by the endless carriers of the elevator, the plows 58 will loosen the beet in the ground so that as the top is pulled upwardly by the elevator, the beet will come out of the ground easily. As the beet is raised and carried rearwardly, supported from the top which is gripped between the resilient tubular bodies 41, which make up the endless carrier, it will pass into the area 34 where for a short period it will move rearwardly along a horizontal path. At this time the gripper chains will catch the beet at the lower part or base of the top close to where it joins the body of the beet. As the beet then passes further to the rear, the body will be held on a horizontal path while the top will be straightened out or stretched by the still upwardly rising elevator and in this condition the beet will be carried in between the rotating disk knives 74 which will sever the top from the body, allowing the beet to drop down onto the conveyor 79. The top will be carried rearwardly and will be discharged onto the platform 77, being pulled free from the elevator and the gripper chains by the parallel rearwardly extending pairs of fingers 75 and 76.

When the machine is being transported from one field to another or is not in operation, the forward end of the elevator will be raised by oscillating the lever 52 forwardly, the latching finger 56 being released for engagement with the toothed segment 57. When the elevator is thus lifted, the leaf raising fingers or arms will also be raised from the ground through the contact of the forward ends of the two portions of the elevator with the arms 92 in the curved area thereof where the parts 93 and 94 of the arms are joined together. It will be readily apparent that when the lever 52 is oscillated forwardly to raise the elevator, the entire elevator structure will swing on a center co-axial with the wheels 16 as the hangers 14 which support the vertical frame 12 will rock on the axles 15. The conveyor 79 is supported from the frame 1 and, therefore, does not change its position when the elevator is raised and when the frame 12 together with the structure supported thereby is rocked on the axles 15.

What is claimed is:

1. A beet harvesting machine, comprising a horizontal body frame having wheel supporting means at its rear end, means at the other end of the frame for attaching the same to a draft machine, a beet elevator structure supported at one end in said frame and extending forwardly and downwardly to have its other end in close proximity to the ground, a pair of ground engaging wheels disposed forwardly of and connected with and supporting the forward end of the elevator, said pair of wheels functioning to vertically shift the adjacent end of the elevator in accordance with variations in the contour of the ground, said elevator being constructed and arranged to grip the tops of beets and to raise the same and carry them rearwardly, plow means carried by the frame for lifting the beets from the ground, and means disposed in close proximity to the ground and immediately in advance of the elevator for lifting the beet tops from the ground whereby said tops may be conveniently picked up by the elevator.

2. A beet harvesting machine, comprising a wheel supported vertically arranged frame, a horizontally disposed frame constituting the body of the machine, pivotal coupling means between the rear end of said horizontal frame and the vertical frame, said frames being relatively oscillatable on a common transverse axis, means at the forward end of said horizontal frame for coupling the same to a draft machine, a beet top gripping elevator structure extending longitudinally of the machine and supported at one end in said vertical frame, the elevator structure extending forwardly and downwardly and terminating at its other end in close proximity to the ground, said elevator structure including endless members arranged to have contacting inner runs extending longitudinally of the machine between which runs the tops of beets are gripped, a wheeled support for the forward end of said elevator, means carried by the horizontal frame and connected with said elevator and wheeled support whereby the elevator and support therefor may be raised, an auxiliary beet top gripping means carried by the vertical frame beneath said elevator at the rear end of the latter, and rotary knives carried by the vertical frame beneath the auxiliary gripping means for severing the beet bodies from their tops.

3. A beet harvesting machine, comprising a wheel supported vertically arranged frame, a horizontally disposed frame constituting the body of the machine, pivotal coupling means between the rear end of said horizontal frame and the vertical frame, said frames being relatively oscillatable on a common transverse axis, means at the forward end of said horizontal frame for coupling the same to a draft machine, a beet top gripping elevator structure extending longitudinally of the machine and supported at one end in said vertical frame, the elevator structure extending forwardly and downwardly and terminating at its other end in close proximity to the ground, said elevator structure including endless members arranged to have contacting inner runs extending longitudinally of the machine between which runs the tops of beets are gripped, a wheeled support for the forward end of said elevator, means carried by the horizontal frame and connected with said elevator and wheeled support whereby the elevator and support therefor may be raised, an auxiliary beet top gripping means carried by the vertical frame beneath said elevator at the rear end of the latter, rotary knives carried by the vertical frame beneath the auxiliary gripping means for severing the beet bodies from their tops, a rearwardly extending conveyor structure disposed beneath said knives for receiving the beet bodies and carrying them rearwardly and upwardly to a following receiver, and a tiltable top receiving platform disposed rearwardly of the elevator, and gripper means, onto which the beet tops are discharged.

4. In a beet harvesting machine including a wheel supported frame and an elongated elevator structure extending longitudinally of the frame and having a forward end portion arranged in close proximity to the ground, means supporting the rear end of the elevator structure facilitating vertical oscillation of the structure relative to said frame whereby the lifting of the forward end of the elevator from the ground may be accomplished, means coupling the forward end of the elevator structure with the frame for effecting the raising of the structure, said elevator structure including endless carriers arranged to have two runs thereof in contacting parallel relation extending along the longitudinal center of the machine, between which runs beet tops may be gripped to be raised from the ground, beet top lifting means supported by the frame independently of the elevator and comprising a pair of forwardly extending arms each disposed in close proximity to the forward end of the elevator at one side of the longitudinal center thereof and adapted to pass beneath and raise beet tops from the ground prior to their engagement between the contacting runs of the endless carriers, and means by which said arms may be engaged by the forward end of the elevator and raised after the said end of the elevator is raised a predetermined distance.

5. In a beet harvesting machine including a wheel supported frame and an elongated elevator structure extending longitudinally of the frame and having a forward end portion arranged in close proximity to the ground, means supporting the rear end of the elevator structure facilitating vertical oscillation of the structure relative to said frame whereby the lifting of the forward end of the elevator from the ground may be accomplished, means coupling the forward end of the elevator structure with the frame for effecting the raising of the structure, said elevator structure including endless carriers arranged to have two runs thereof in contacting parallel relation extending along the longitudinal center of the machine, between which runs beet tops may be gripped to be raised from the ground, plow means for raising the beets from the ground at the forward end of the elevator, beet top lifting means carried by the frame and comprising a pair of forwardly extending arms each disposed in close proximity to the forward end of the elevator at one side of the longitudinal center thereof and adapted to pass beneath and raise beet tops from the ground prior to their engagement between the contacting runs of the endless carriers, cutting means at the opposite end of the elevator structure for severing the beet bodies from the tops, said beet top lifting arms each having a vertical portion contacting an adjacent portion of the elevator, and a rearwardly curved portion normally disposed above the elevator and adapted to be engaged thereby when the elevator is raised a predetermined distance from the ground whereby the arms will be oscillated and raised from the ground by the elevator.

6. A beet harvesting machine, comprising a vertically disposed frame structure, a pair of supporting wheels for said structure, a body frame, means supporting the body frame at its rear end from said first frame whereby the two frames may have relative oscillation upon an axis concentric with the supporting wheels, a pair of vertically arranged shafts carried by the first frame and disposed on opposite sides of the longitudinal center of the machine, said shafts being coupled for unitary rotation, a pair of sprocket wheels each carried by a shaft in a common horizontal plane, a second pair of sprocket wheels in a common horizontal plane beneath the first wheels and each carried by a shaft, an elevator structure including a pair of endless carriers each passing around one of said first sprocket wheels, said endless carriers extending forwardly and downwardly with respect to the body frame and supported at their forward ends whereby they have contacting inner runs adapted to grip beet tops, means facilitating the support of the forward end of the body frame, means for supporting the forward end of the elevator whereby the latter has free vertical movement relative to the ground, means for facilitating the raising and lowering of the front end of the elevator relative to the body frame, a pair of sprocket wheels rotatably supported in the same plane as the second-mentioned pair of sprocket wheels and coacting therewith for the support of endless gripper chains, said endless gripper chains coacting with the endless carriers for moving a beet horizontally at the rear end of the elevator, cutting means beneath said gripper chains for severing the beet tops from the bodies thereof, and means for transmitting rotary power to one of said shafts.

7. A beet harvesting machine, comprising a horizontally arranged body frame, a vertically disposed frame extending transversely of the body frame, a pair of wheels disposed beneath and supporting the vertical frame, means coupling the body frame with said vertical frame facilitating the relative oscillation of the frames on the axial centers of said wheels, an elongated elevator structure having one end disposed above the body frame within and supported by the vertical frame and having its other end disposed beneath the body frame adjacent the forward end thereof and in close proximity to the ground, said elevator structure including a pair of endless carriers having contacting parallel runs between which beet tops are engaged, power transmitting means carried by the vertical frame for effecting the movement of said endless carriers, means for supporting the forward end of the elevator, means for effecting the support of the forward end of the body frame, means adjacent and beneath the forward ends of the elevator for lifting beets from the ground, said elevator having a horizontally disposed portion in advance of the rear end thereof, a beet top gripping means disposed beneath the rear end of the elevator and constructed and arranged to grip the beet tops adjacent the said horizontal portion of the elevator and move the beets and tops along a horizontal path toward the rear of the machine and away from the rear end of the elevator, and cutting knives rotatably supported beneath said gripping means for severing the tops from the bodies of the beets.

8. A beet harvesting machine, comprising a horizontally arranged body frame, a vertically disposed frame extending transversely of the body frame, a pair of wheels disposed beneath and supporting the vertical frame, means coupling the body frame with said vertical frame facilitating the relative oscillation of the frames on the axial centers of said wheels, an elongated elevator structure having one end disposed above the body frame within and supported by the vertical frame and having its other end disposed beneath the body frame adjacent the forward end thereof and in close proximity to the ground, said elevator structure including a pair of endless carriers having contacting parallel runs between which beet tops are engaged, power transmitting means carried by the vertical frame for effecting the movement of said endless carriers, means for supporting the forward end of the elevator, means for effecting the support of the forward end of the body frame, means adjacent and beneath the forward ends of the elevator for lifting beets from the ground, said elevator having a horizontally disposed portion in advance of the rear end thereof, a beet top gripping means disposed beneath the rear end of the elevator and constructed and arranged to grip the beet tops adjacent the said horizontal portion of the elevator and move the beets and tops along a horizontal path toward the rear of the machine and away from the rear end of the elevator, cutting knives rotatably supported beneath said gripping means for severing the tops from the bodies of the beets, means for separately receiving the tops and the bodies of the beets after the same have been separated, and rearwardly extending spaced parallel finger members disposed above and below said gripping means for effecting the positive removal of the beet tops from the gripping means and from the elevator.

9. In a beet harvester, including a horizontally disposed wheel supported frame, an elevator structure extending longitudinally of the frame from the rear end thereof forwardly and downwardly, the forward end of the elevator structure being in close proximity to the ground, said elevator including endless carriers arranged to have two runs thereof in contacting parallel relation extending along the longitudinal center of the machine, between which runs beet tops may be gripped to be raised from the ground, means supporting the rear end of the elevator for oscillation on an axis extending transversely of the machine, means adjacent the rear end of and beneath the elevator for gripping the bodies of beets supported by their tops from the elevator and carrying the said bodies along a straight path to the rear end of the elevator, the elevator being straight and horizontal through a portion of its length adjacent the forward end of said body gripping means and then continuing upwardly and extending rearwardly over the body gripping means, and means adjacent the rear end of the elevator and the body gripping means for severing the tops from the bodies.

10. In a beet harvesting machine, a horizontally disposed frame structure, supporting wheels connected with said frame structure at the rear end thereof, the forward end of the frame structure being designed for connection with and support by a draft vehicle, an elevator structure extending longitudinally of the frame structure from the rear end of the latter forwardly and downwardly and terminating at its forward end in close proximity to the ground, said elevator structure including endless carriers arranged to have two runs thereof in contacting parallel relation between which runs beet tops may be gripped to be raised from the ground, an arm coupled with the forward end of the elevator structure and extending upwardly and forwardly therefrom, a pair of guide wheels connected with the forward end of said arm and functioning as the sole support for the forward end of the elevator to maintain the same at a predetermined distance above the ground, means carried by the frame and coupled with said arm for effecting the raising of the arm, wheels and elevator, and means adjacent the forward end of the elevator for penetrating the ground and lifting beets therefrom.

11. In a beet harvesting machine, a horizontally disposed frame structure, supporting wheels connected with said frame structure at the rear end thereof, the forward end of the frame structure being designed for connection with and support by a draft vehicle, an elevator structure extending longitudinally of the frame structure from the rear end of the latter forwardly and downwardly and terminating at its forward end in close proximity to the ground, said elevator structure including endless carriers arranged to have two runs thereof in contacting parallel relation between which runs beet tops may be gripped to be raised from the ground, an arm coupled with the forward end of the elevator structure and extending upwardly and forwardly therefrom, a pair of guide wheels connected with the forward end of said arm and functioning to support the forward end of the elevator at a predetermined distance above the ground, means carried by the frame and coupled with said arm for effecting the raising of the arm, wheels and elevator, a pair of arms pivotally connected with the frame and extending downwardly and rearwardly therefrom, a plow carried by each arm and extending forwardly and downwardly beneath a run of the elevator, said plows being disposed upon opposite sides of the longitudinal center of the elevator, and means carried by the frame and connected with said plow arms for effecting the vertical movement of the plows independently of the elevator.

12. In a beet harvesting machine, including a substantially horizontal wheel supporting frame, an elongated elevator structure supported at one end adjacent the rear of said frame for oscillation on a horizontal axis extending transversely of the frame, said elevator structure extending forwardly and downwardly to a point in close proximity to the ground at its forward end, a pair of ground engaging wheels disposed forwardly of the elevator structure, means coupling said wheels with the forward end of the elevator structure whereby the latter is supported at its forward end solely by said wheels, said elevator structure including a pair of endless carriers arranged to have two runs thereof in contacting parallel relation between which runs beet tops may be gripped to be raised from the ground, means associated with the runs of the elevator structure for lifting beets from the earth, and a pair of spaced beet top lifting fingers disposed in advance of and extending forwardly from the forward end of the elevator structure and extending upwardly and curving rearwardly over the top of the forward end of the structure and then extending upwardly to and having pivotal connection with said frame, the said rearwardly curving portion of said top lifting arms being arranged for engagement by the forward end of the elevator when the latter is raised.

13. In a beet harvesting machine, including an elevator structure, comprising a pair of endless carriers arranged to have two runs thereof in contacting parallel relation extending along the longitudinal center of the machine, between which runs beet tops may be gripped to be raised from the ground, a vertical frame structure, a pair of wheels supporting said frame structure on axes extending transversely of the machine, an elongated horizontal frame having a pair of vertically extending bearing standards at one end, said bearing standards being coupled with the first frame for oscillation on the axis of said wheels and independently of the vertical frame, means at the other end of said horizontal frame facilitating its attachment to and support by a draft machine, means coupling one end of said elevator structure with and for support by said vertical frame, the other end of the elevator structure being disposed beneath and adjacent the forward end of the horizontal frame, ground engaging wheels coupled with the forward end of the elevator structure and supporting the same independently of the horizontal frame, means carried by the horizontal frame and connected with the forward end of the elevator structure facilitating the raising and lowering of the elevator structure, the said vertical frame being oscillated on the axis for said wheels upon raising and lowering of the elevator structure, and means for transmitting driving power to the runs of the elevator structure facilitating the free raising and lowering of the elevator structure while the latter is in operation.

14. A beet harvesting machine, comprising a horizontal body frame having a rear end and wheel supporting means for said end, means at the other end of the frame for attaching the same to a draft machine, a beet elevator structure having an end supported above said frame by the wheel supporting means above and to swing vertically about the axis of rotation of the wheels, the elevator extending forwardly and downwardly to have its other end in close proximity to the ground, the elevator having free vertical oscillation about said axis, ground engaging gauge wheels disposed adjacent the forward end of the conveyor, an operative coupling between said gauge wheels and the conveyor by which the latter wheels function to raise and lower the forward end of the conveyor in accordance with changes in the contour of the ground, plows disposed immediately rearwardly of the said forward end of the conveyor, the conveyor being arranged to grip the beet tops in advance of the loosening of the beets in the earth by the plows, and means operatively coupling the plows with the frame and facilitating vertical movement of the plows.

15. A beet harvesting machine, comprising a body frame, a second frame disposed above and at the rear of the body frame, wheel supporting means for the frames, said frames being supported for independent oscillation on a horizontal axis extending transversely of the frame, an elongated elevator structure having one end disposed above the body frame and supported entirely by the second frame, said elevator having its other end disposed beneath the body frame adjacent the forward end thereof and in close proximity to the ground, said elevator including a pair of endless carriers having contacting parallel runs between which beet tops are engaged, power transmitting means carried by the second frame and operatively coupled with said endless carriers for moving the same, means for supporting the forward end of the elevator, means for effecting the support of the forward end of the body frame, means adjacent and beneath the forward ends of the elevator for lifting the beets from the ground, the elevator having a horizontally disposed portion in advance of the rear thereof, a beet top gripping means disposed beneath the rear end of the elevator and having a portion arranged to grip the beet tops and move the beets and tops along a horizontal path toward the rear of the machine, and cutting knives adjacent said gripping means for severing the tops from the bodies of the beets.

16. A beet harvesting machine, comprising a body frame, a second frame disposed above and at the rear of the body frame, wheel supporting means for the frames, said frames being supported for independent oscillation on a horizontal axis extending transversely of the frame, an elongated elevator structure having one end disposed above the body frame and supported entirely by the second frame, said elevator having its other end disposed beneath the body frame adjacent the forward end thereof and in close proximity to the ground, said elevator including a pair of endless carriers having contacting parallel runs between which beet tops are engaged, power transmitting means carried by the second frame and operatively coupled with said endless carriers for moving the same, means for supporting the forward end of the elevator, means for effecting the support of the forward end of the body frame, means adjacent and beneath the forward ends of the elevator for lifting the beets from the ground, the elevator having a horizontally disposed portion in advance of the rear thereof, a beet top gripping means disposed beneath the rear end of the elevator and having a portion arranged to grip the beet tops and move the beets and tops along a horizontal path toward the rear of the machine, cutting knives adjacent said gripping means for severing the tops from the bodies of the beets, a rearwardly extending pair of spaced parallel fingers disposed above said gripping means, and a rearwardly extending pair of spaced parallel fingers disposed below the gripping means, the fingers of each pair being in close proximity to the path of travel of a beet carried by the gripping means and functioning to effect the positive removal of the beet tops and the beet bodies respectively from the elevator and from the gripping means.

WALTER J. FLINTJER.